United States Patent
Miyamoto et al.

(10) Patent No.: US 12,384,247 B2
(45) Date of Patent: Aug. 12, 2025

(54) DISPLAY DEVICE AND HEAD-UP DISPLAY

(71) Applicant: Panasonic Intellectual Property Management Co., Ltd., Osaka (JP)

(72) Inventors: Tomoaki Miyamoto, Osaka (JP); Kizashi Mikami, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 247 days.

(21) Appl. No.: 18/197,855

(22) Filed: May 16, 2023

(65) Prior Publication Data

US 2023/0406102 A1 Dec. 21, 2023

(30) Foreign Application Priority Data

May 27, 2022 (JP) .................................. 2022-087148

(51) Int. Cl.
*B60K 35/00* (2024.01)
*B60K 35/23* (2024.01)

(52) U.S. Cl.
CPC .............. *B60K 35/00* (2013.01); *B60K 35/23* (2024.01); *B60K 2360/23* (2024.01); *B60K 2360/332* (2024.01)

(58) Field of Classification Search
CPC .............. B60K 2360/332; B60K 35/23; B60K 2360/23
See application file for complete search history.

(56) References Cited

U.S. PATENT DOCUMENTS

| | | | | |
|---|---|---|---|---|
| 4,043,636 | A * | 8/1977 | Eberhardt | G04G 9/0041 |
| | | | | 349/113 |
| 8,398,259 | B2 * | 3/2013 | Kwak | F21K 9/00 |
| | | | | 362/217.05 |
| 10,371,952 | B2 * | 8/2019 | Wheelwright | G02B 27/0176 |
| 11,506,933 | B2 * | 11/2022 | Morino | G02F 1/133603 |
| 11,733,570 | B2 * | 8/2023 | Hada | G02F 1/133382 |
| | | | | 353/31 |
| 2004/0212881 | A1 * | 10/2004 | Peterson | G03B 21/28 |
| | | | | 359/457 |
| 2016/0299342 | A1 | 10/2016 | Asai | |
| 2019/0204596 | A1 * | 7/2019 | Shi | G02B 3/08 |
| 2020/0004067 | A1 | 1/2020 | Hada et al. | |
| 2020/0194642 | A1 * | 6/2020 | Nakauchi | H10H 20/856 |
| 2021/0055584 | A1 | 2/2021 | Hada et al. | |
| 2022/0043262 | A1 | 2/2022 | Agemizu et al. | |
| 2023/0152626 | A1 * | 5/2023 | Nishikawa | F21V 9/20 |
| | | | | 349/62 |

FOREIGN PATENT DOCUMENTS

| | | |
|---|---|---|
| JP | 5866644 | 2/2016 |
| JP | 2020-003732 | 1/2020 |
| JP | 2020-183979 | 11/2020 |

* cited by examiner

*Primary Examiner* — Gertrude Arthur Jeanglaude

(74) *Attorney, Agent, or Firm* — Greenblum & Bernstein, P.L.C.

(57) ABSTRACT

A display device is a display device that includes a display panel from which display light showing an image exits and a light source that emits basal light for producing the display light. The display device includes: a first diffusion sheet that diffuses the basal light that is to enter the display panel; a second diffusion sheet that is disposed spaced apart from the first diffusion sheet, and diffuses the basal light that is to enter the first diffusion sheet; and an optical member that includes a plurality of optical elements each of which refracts the basal light that is to enter the second diffusion sheet.

12 Claims, 8 Drawing Sheets

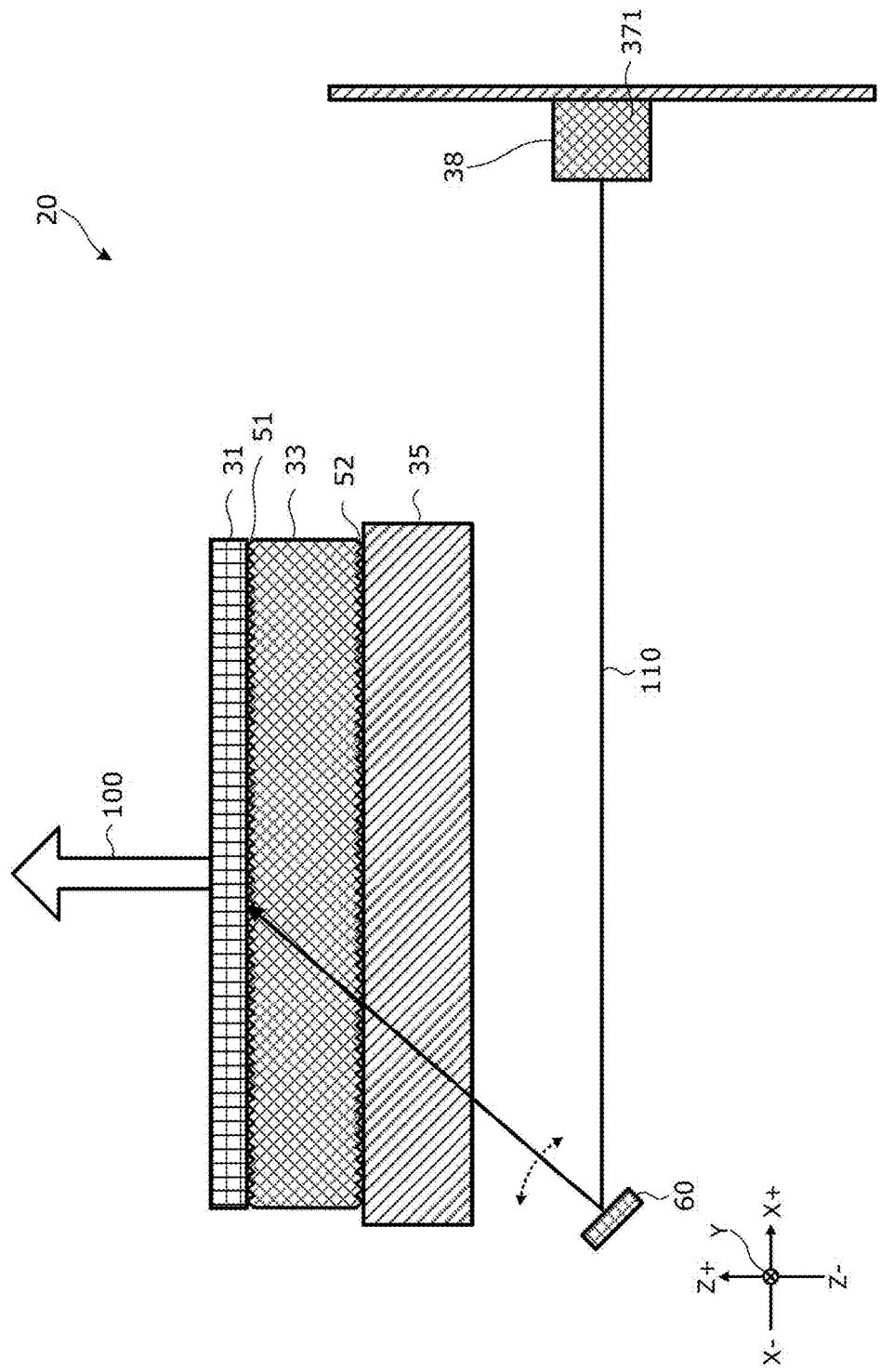

DISPLAY DEVICE AND HEAD-UP DISPLAY

CROSS REFERENCE TO RELATED APPLICATION

The present application is based on and claims priority of Japanese Patent Application No. 2022-087148 filed on May 27, 2022.

FIELD

The present disclosure relates to a display device and a head-up display.

BACKGROUND

A head-up display (HUD) is an in-vehicle device that includes a display device that emits display light showing a predetermined image to display a virtual image of the image on the windshield of a vehicle such that the virtual image is superimposed on a view ahead of the vehicle.

As disclosed by Patent Literature (PTL) 1, the above-described display device may use, for example, a Fresnel lens that diverges light from a backlight for rendering the luminance of display light showing an image uniform for each of areas.

CITATION LIST

Patent Literature

PTL 1: Japanese Unexamined Patent Application Publication No. 2020-3732

SUMMARY

The head-up display disclosed by the above-described PTL 1 can be improved upon.

In view of this, the present disclosure provides a display device and a head-up display which are capable of improving upon the above related art.

A display device according to one aspect of the present disclosure is a display device that includes a display panel from which display light showing an image exits and a light source that emits basal light for producing the display light. The display device includes: a first diffusion structure that diffuses the basal light that is to enter the display panel; a second diffusion structure that is disposed spaced apart from the first diffusion structure, and diffuses the basal light that is to enter the first diffusion structure; and an optical member that includes a plurality of optical elements each of which refracts the basal light that is to enter the second diffusion structure.

A head-up display according to one aspect of the present disclosure is a head-up display that includes a display device including a display panel from which display light showing an image exits and a light source that emits basal light for producing the display light. The head-up display includes: a first diffusion structure that diffuses the basal light that is to enter the display panel; a second diffusion structure that is disposed spaced apart from the first diffusion structure, and diffuses the basal light that is to enter the first diffusion structure; an optical member that includes a plurality of optical elements each of which refracts the basal light that is to enter the second diffusion structure; and a mirror that reflects the display light that exits from the display panel.

A display device and a head-up display according to one aspect of the present disclosure can lower the degree of visual identification of a striped pattern, etc. due to a microstructure of an optical member, and can reduce a reduction in the luminance of display light.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 8 is a cross sectional view of another example of the display device.

DESCRIPTION OF EMBODIMENT

Figure 1:
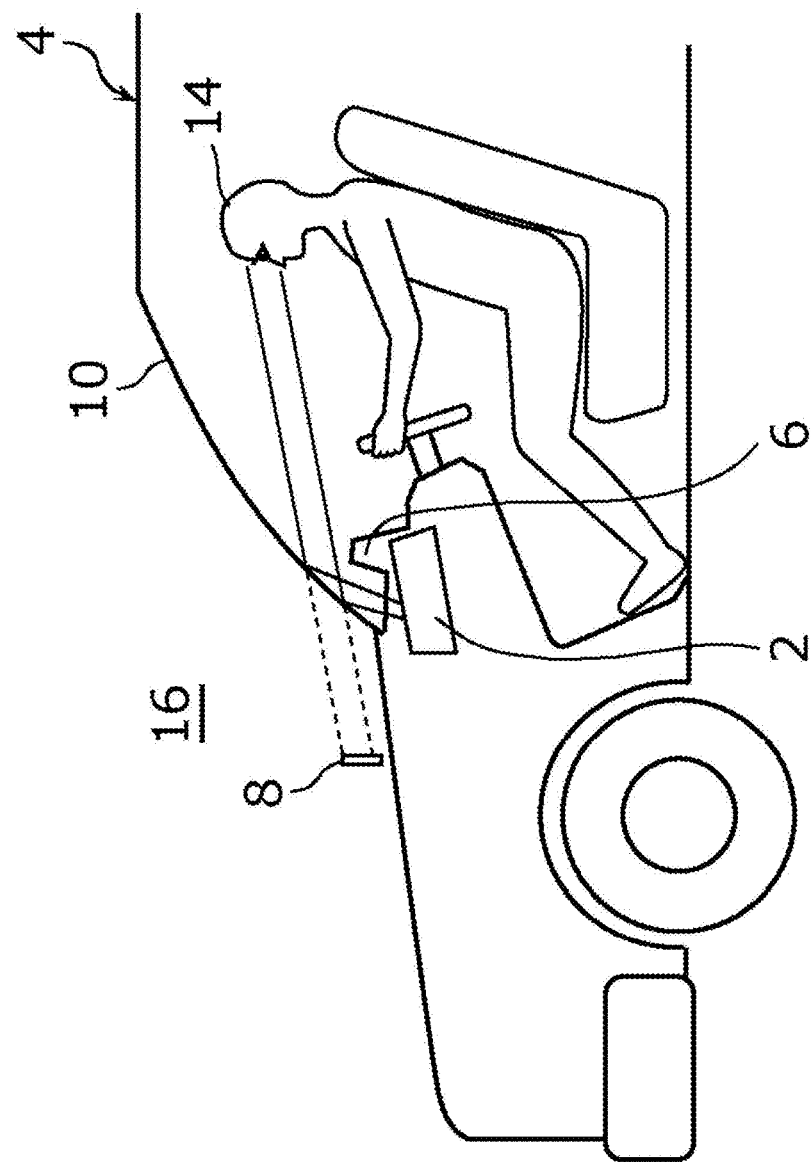
FIG. 1 is a diagram illustrating a vehicle provided with a head-up display according to an embodiment.

The use of a Fresnel lens in a conventional display device can render the whole display device thin. However, the inventors have found that a striped pattern, called a Fresnel pattern, which is produced due to a microstructure provided on a surface of an optical member is visually identified in a virtual image, resulting in a reduction in the quality of the visually identified image. By further conducting researches and experiments, the inventors have found that small pitches of the microstructure of the optical member surface can render the striped pattern unobtrusive; however, the inventors have also found that the foregoing poses a problem of a reduction in the luminance of display light.

The present disclosure provided below is based on knowledge of the inventors, and provides a display device and a head-up display that reduce a reduction in the luminance of display light and lower the degree of visual identification of a striped pattern, etc. due to a microstructure of an optical member.

A display device according to aspect 1 of the present disclosure is a display device that includes a display panel from which display light showing an image exits and a light source that emits basal light for producing the display light. The display device includes: a first diffusion structure that diffuses the basal light that is to enter the display panel; a second diffusion structure that is disposed spaced apart from the first diffusion structure, and diffuses the basal light that is to enter the first diffusion structure; and an optical member that includes a plurality of optical elements each of which refracts the basal light that is to enter the second diffusion structure.

According to the above-described aspect, disposition of the first diffusion structure and the second diffusion structure spaced apart from each other can reduce, for example, stripes in a striped pattern produced in an image, based on the optical member including the plurality of optical elements, which is to exit as display light to a degree that the striped pattern cannot be visually identified even if the first diffusion structure and the second diffusion structure each having a low haze value (details will be described later) are used to reduce a reduction in luminance of the display light.

In addition to aspect 1, the display device according to aspect 2 of the present disclosure includes: a first diffusion sheet including the first diffusion structure; a second diffusion sheet including the second diffusion structure; and a light-transmissive member disposed between the first diffusion sheet and the second diffusion sheet.

According to the above-described aspect, disposition of a sheet including the first diffusion structure and a sheet including the second diffusion structure on respective sides of the light-transmissive member can stably dispose, with a simple configuration, the first diffusion structure and the second diffusion structure with a predetermined distance therebetween.

In addition to aspect 1, the display device according to aspect 3 of the present disclosure includes: a first diffusion sheet including the first diffusion structure; a second diffusion sheet including the second diffusion structure; and a holder that holds the first diffusion sheet and the second diffusion sheet with a predetermined distance therebetween.

According to the above-described aspect, a sheet including the first diffusion structure and a sheet including the second diffusion structure can be, with a simple configuration, disposed with a predetermined distance therebetween.

In addition to aspect 1, the display device according to aspect 4 of the present disclosure includes: a light-transmissive member including a first principal surface on which the first diffusion structure is provided and a second principal surface on which the second diffusion structure is provided. The first principal surface faces the display panel, and the second principal surface is on the opposite side of the first principal surface.

According to the above-described aspect, the first diffusion structure and the second diffusion structure can be disposed with a predetermined distance therebetween, while the number of components is reduced.

In addition to any of aspect 1, aspect 2, aspect 3, and aspect 4, the display device according to aspect 5 of the present disclosure includes the optical member including a surface on which at least one of the plurality of optical elements is disposed. The surface is on a side of the second diffusion structure.

In addition to any of aspect 1, aspect 2, aspect 3, aspect 4, and aspect 5, the display device according to aspect 6 of the present disclosure incudes the optical member including a surface on which at least one of the plurality of optical elements is disposed. The surface is on the opposite side of the second diffusion structure.

In addition to any of aspect 1, aspect 2, aspect 3, aspect 4, aspect 5, and aspect 6, the display device according to aspect 7 of the present disclosure includes the optical member that is one of the following: a Fresnel lens, a lenticular lens, a fly-eye lens, and a prism.

In addition to any of aspect 1, aspect 2, aspect 3, aspect 4, aspect 5, aspect 6, and aspect 7, the display device according to aspect 8 of the present disclosure includes the optical member that includes a first optical surface facing the display panel and a second optical surface on the opposite side of the first optical surface. Moreover, at least one of the first optical surface or the second optical surface is consisted of at least two types of the following optical surfaces: (i) a Fresnel surface; (ii) an optical surface including a plurality of convex lenses; (iii) an optical surface including a plurality of concave lenses; and (iv) an optical surface including a plurality of prisms.

In addition to any of aspect 1, aspect 2, aspect 3, aspect 4, aspect 5, aspect 6, and aspect 7, the display device according to aspect 9 of the present disclosure includes the optical member that includes a first optical surface facing the display panel and a second optical surface on the opposite side of the first optical surface. The first optical surface and the second optical surface each are consisted of one of the following optical surfaces: (i) a Fresnel surface; (ii) an optical surface including a plurality of convex lenses; (iii) an optical surface including a plurality of concave lenses; and (iv) an optical surface including a plurality of prisms. Moreover, a type of the first optical surface and a type of the second optical surface are different.

A head-up display according to the present disclosure is a head-up display that includes a display device including a display panel from which display light showing an image exits and a light source that emits basal light for producing the display light. the head-up display includes: a first diffusion structure that diffuses the basal light that is to enter the display panel; a second diffusion structure that is disposed spaced apart from the first diffusion structure, and diffuses the basal light that is to enter the first diffusion structure; an optical member that includes a plurality of optical elements each of which refracts the basal light that is to enter the second diffusion structure; and a mirror that reflects the display light that exits from the display panel.

According to the above-described aspect, disposition of the first diffusion structure and the second diffusion structure spaced apart from each other can reduce, for example, stripes in a striped pattern produced in a virtual image, based on the optical member including the plurality of optical elements, which is to exit as display light to a degree that the striped pattern cannot be visually identified even if the first diffusion structure and the second diffusion structure each having a low haze value are used to reduce a reduction in luminance of the display light.

Hereinafter, an embodiment of a display device and a head-up display including the display device will be described with reference to the drawings. It should be noted that embodiments below are examples presented for describing the present disclosure, and thus are not intended to limit the present disclosure. For example, the shapes, structures, materials, structural elements, relative positional relationships, connection states, numerical values, mathematical expressions, details of steps in methods, orders of the steps, described in the following embodiments are mere examples. Accordingly, the present disclosure may include features not presented below. Moreover, geometrical expressions such as parallel and orthogonal may be used, but these expressions do not indicate mathematical strictness. These expressions include substantially allowable errors, deviations, etc. Expressions such as simultaneous and identical also include substantially allowable ranges.

The drawings are schematic diagrams including emphases, omissions, and/or proportional adjustments as appropriate for describing the present disclosure, and thus are different from the actual shapes, actual positional relationships, and/or actual proportions. In addition, the X axis, the Y axis, and the Z axis which may be shown in the drawings are orthogonal coordinates optionally set for description of the drawings. In other words, the Z axis is not limited to be extended along a vertical direction, and the X axis and the Y axis need not be within a horizontal plane.

The following may comprehensively describe a plurality of disclosures as one embodiment. Moreover, some contents stated below are described as optional structural elements relating to the present disclosure.

Figure 2:
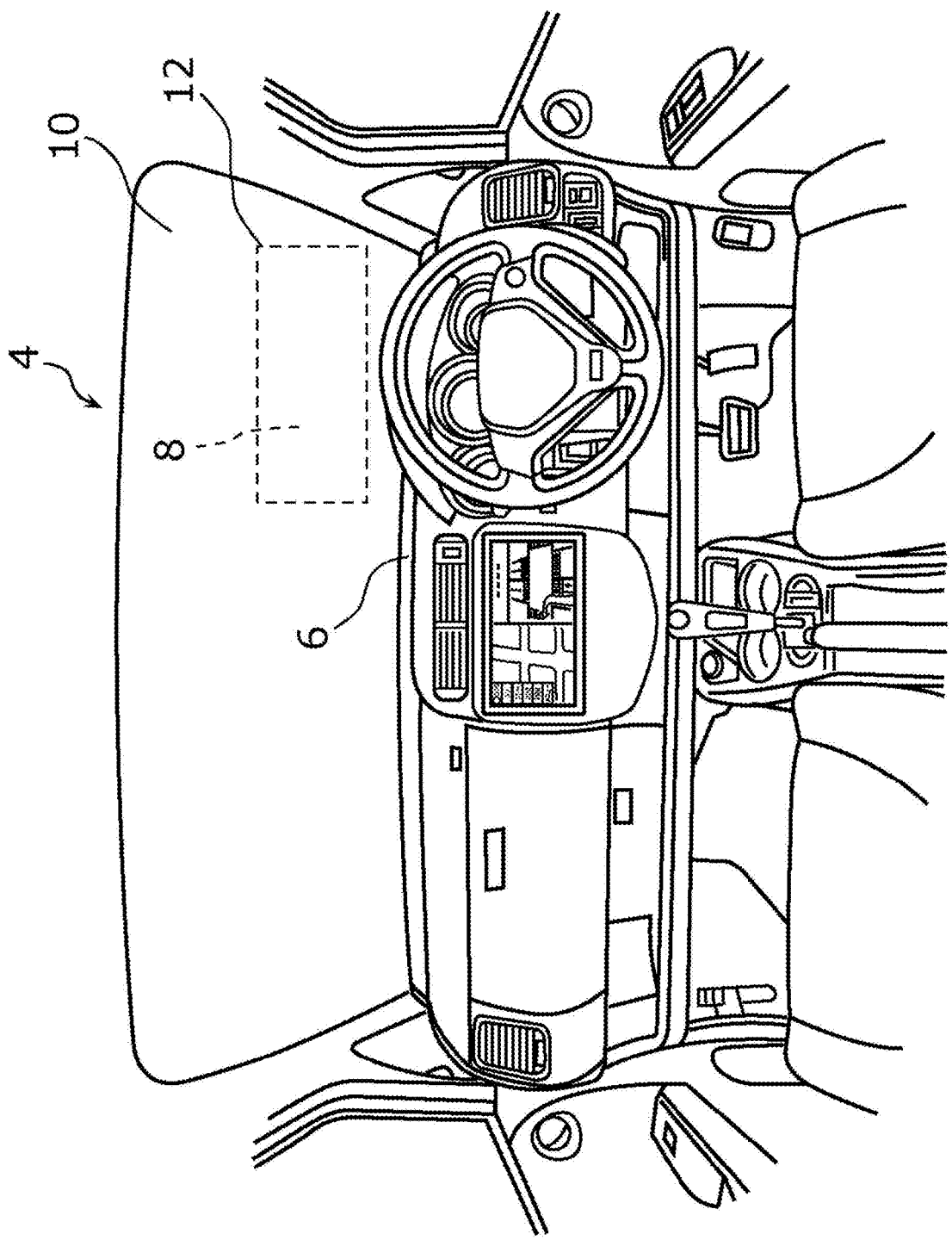
FIG. 2 is a diagram illustrating an area of a windshield in which an HUD image is displayed by the head-up display according to the embodiment.
Figure 3:
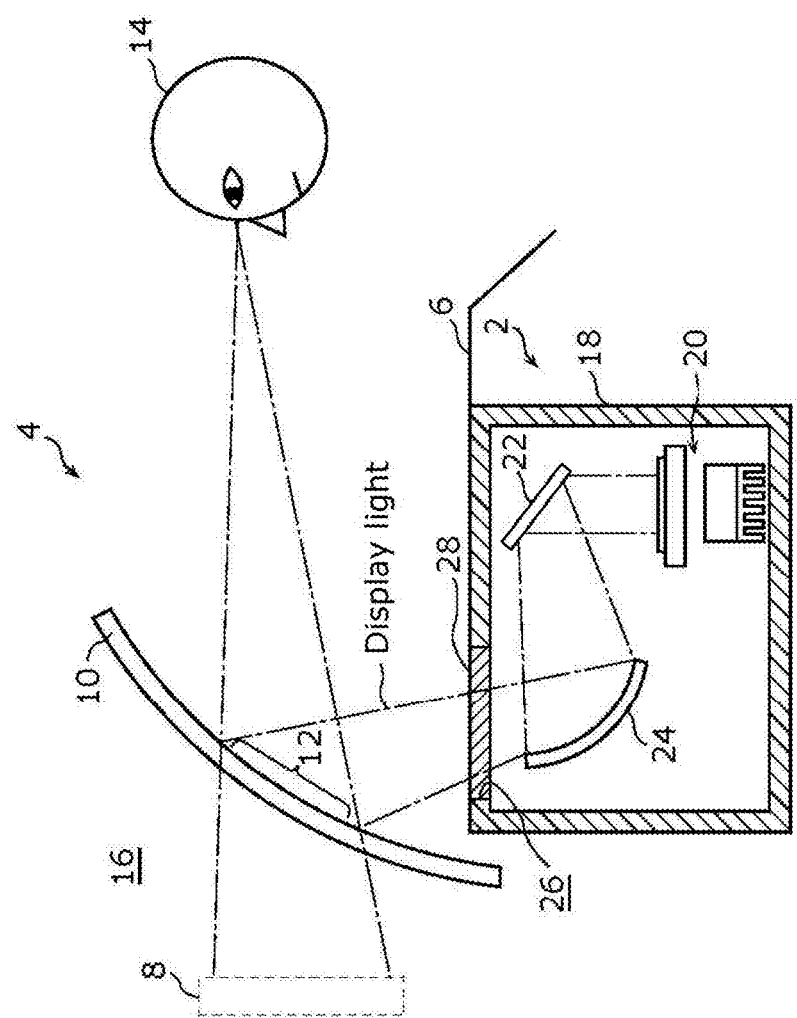
FIG. 3 is a diagram illustrating a configuration of the head-up display according to the embodiment.

First, a configuration of head-up display 2 according to an embodiment will be described with reference to FIG. 1 through FIG. 3. FIG. 1 is a diagram illustrating vehicle 4 that is provided with head-up display 2 according to the embodiment. FIG. 2 is a diagram illustrating area 12 of windshield 10 in which HUD image 8 is displayed by head-up display 2 according to the embodiment. FIG. 3 is a diagram illustrating a configuration of head-up display 2 according to the embodiment.

As illustrated in FIG. 1, head-up display 2 is provided inside dashboard 6 of vehicle 4, such as an automobile. As illustrated in FIG. 1 through FIG. 3, head-up display 2 emits display light for displaying HUD image 8 that is a virtual image toward area 12 located closer to the driver's seat and on the lower side of windshield 10 (one example of a display medium) of vehicle 4, for example. The display light reflects off area 12 of windshield 10 and travels toward driver 14. With this, driver 14 can see HUD image 8, that is a virtual image, in area 12 of windshield 10 such that the virtual image is superimposed on a view ahead of windshield 10. In other words, driver 14 sees HUD image 8 as if HUD image 8 is displayed in space 16 ahead of windshield 10.

As illustrated in FIG. 3, head-up display 2 includes casing 18, display device 20, first mirror 22 (one example of a mirror), and second mirror 24 (one example of a mirror).

Casing 18 is formed in the shape of a box, and includes metal such as aluminum. Casing 18 is disposed inside dashboard 6 of vehicle 4. Casing 18 accommodates, inside casing 18, display device 20, first mirror 22, and second mirror 24. Casing 18 includes a top surface disposed so as to face windshield 10. Casing 18 includes opening 26 in the top surface. This opening 26 is covered by cover member 28 that is, for example, a transparent resin plate.

Display device 20 is a picture generation unit (PGU) for emitting, toward first mirror 22, display light for displaying HUD image 8. A configuration of display device 20 will be described later.

First mirror 22 is, for example, a plane mirror, and reflects display light from display device 20 toward second mirror 24. Second mirror 24 is, for example, a concave mirror, and reflects the display light from first mirror 22 toward area 12 of windshield 10. The display light from second mirror 24 passes through cover member 28, reflects off area 12 of windshield 10, and then enters the eyes of driver 14.

Note that although head-up display 2 includes two mirrors (first mirror 22 and second mirror 24) in this embodiment, the number of mirrors is not limited to two as described above. Head-up display 2 may include a single mirror or three or more mirrors.

Figure 4:
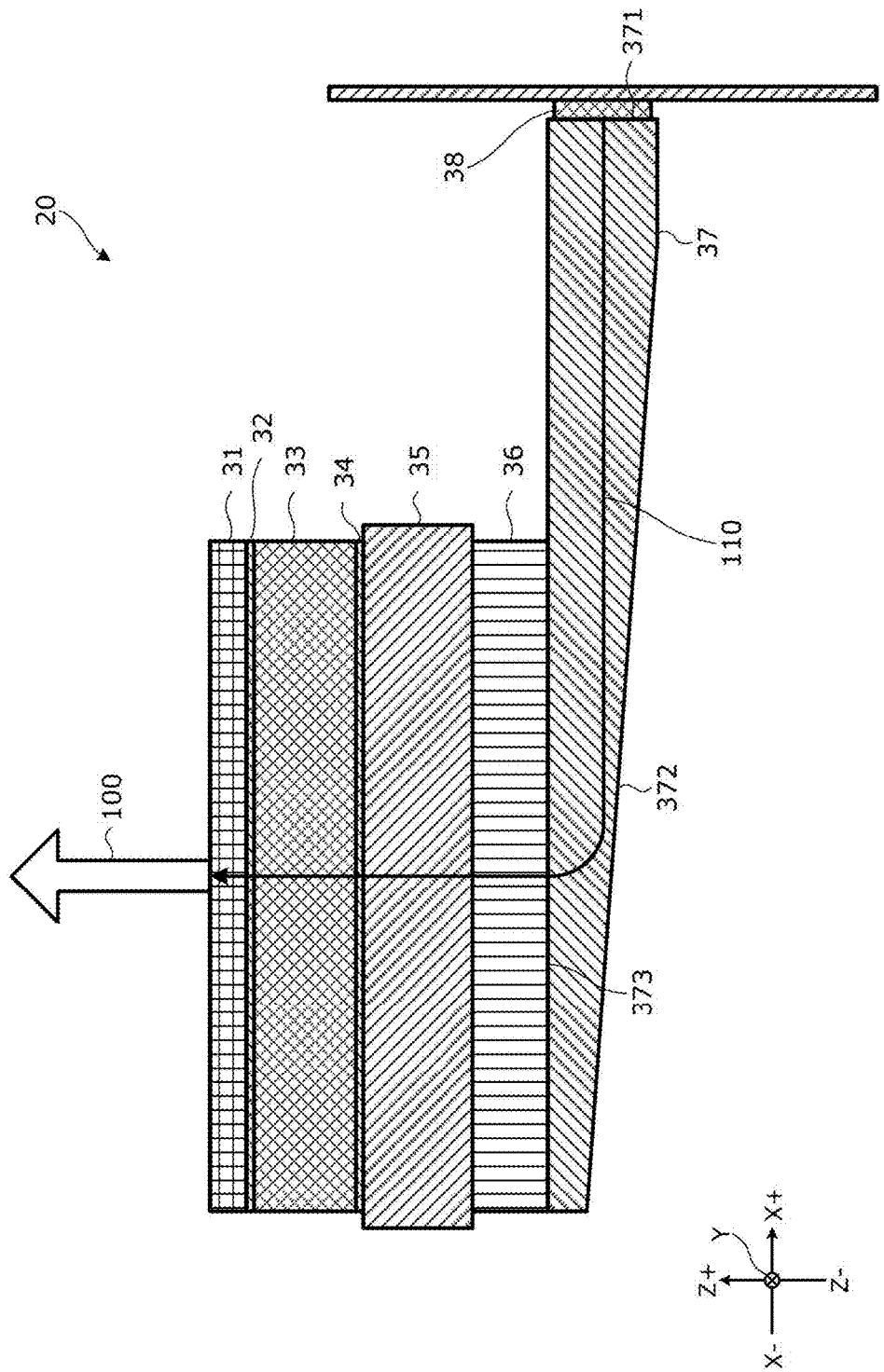
FIG. 4 is a cross sectional view of a display device according to the embodiment.
Figure 5:
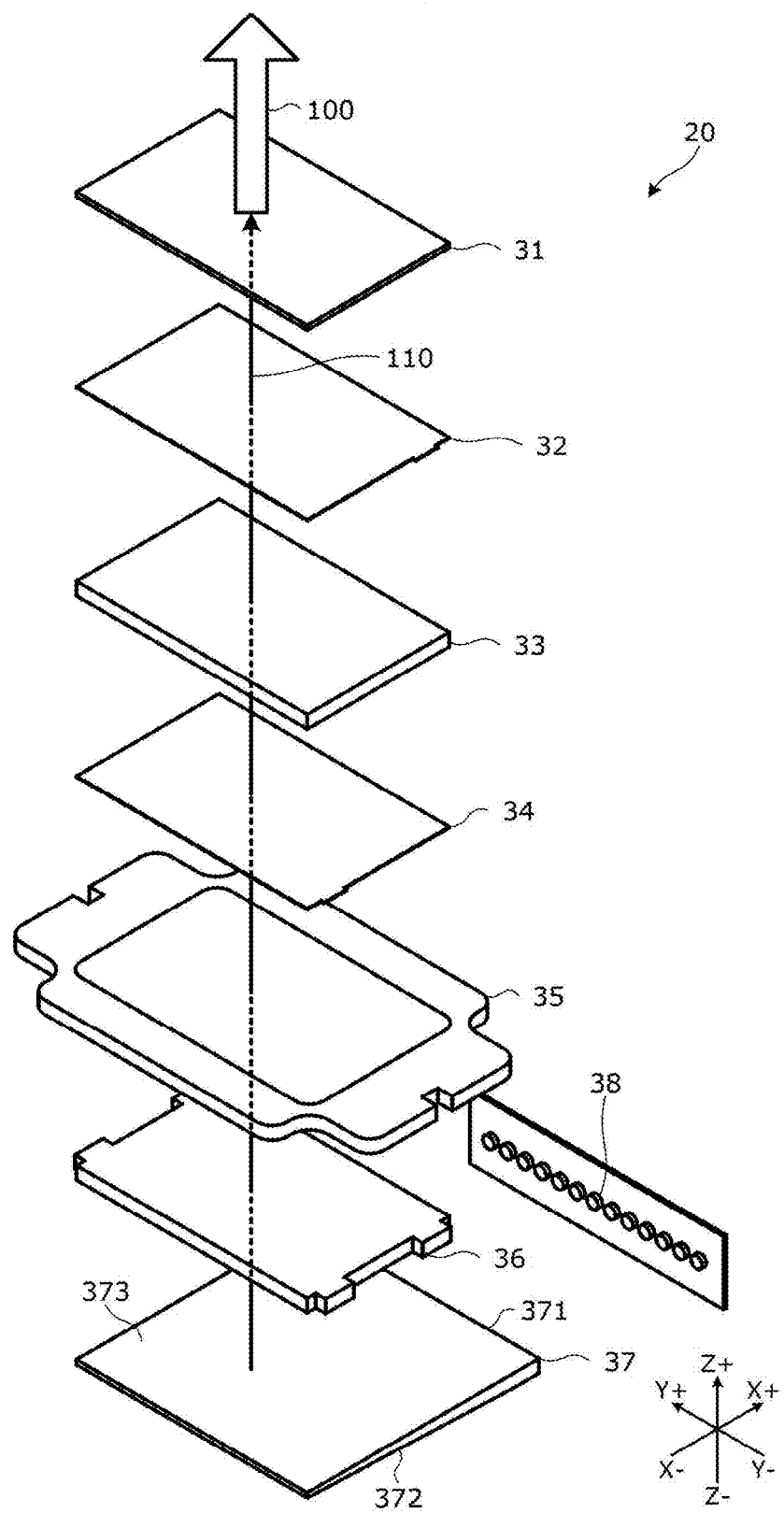
FIG. 5 is an exploded perspective view of the display device according to the embodiment.

Next, a configuration of display device 20 will be described with reference to FIG. 4 and FIG. 5. FIG. 4 is a cross sectional view of display device 20 according to the embodiment. FIG. 5 is an exploded perspective view of display device 20 according to the embodiment. Note that the illustration of the casing is omitted.

As illustrated in FIG. 4, display device 20 is a device that emits display light 100 by which an image is produced. Display device 20 includes display panel 31, first diffusion sheet 32, light-transmissive member 33, second diffusion sheet 34, Fresnel lens 35 that is one of optical members, prism plate 36 that is one of optical members, light guide plate 37, and light sources 38.

Display panel 31 is a member from which display light 100 showing an image based on received basal light 110 exits. In this embodiment, display panel 31 is a liquid crystal panel that functions as a spatial light modulator. Basal light 110 that has entered the back surface (a surface on the negative side of the Z axis in the diagram) of display panel 31 passes through the liquid crystal panel to produce an image, and exits as display light 100.

First diffusion sheet 32 is a sheet-like member having a first diffusion structure that diffuses basal light 110 that enters display panel 31. Note that the sheet includes a member that bends due to its own weight and a member that does not bend due to its own weight. The first diffusion structure is a structure having a function of improving the uniformity ratio of basal light 110 that enters display panel 31. Specifically, the following structures can be exemplified as the first diffusion structure: (i) an uneven structure including very small bumps which is provided on a surface of a member having light-transmissive properties, (ii) a structure in which fine particles reflecting basal light 110 are dispersedly provided inside a member having light-transmissive properties, and (iii) a structure in which very small cavities are dispersedly provided inside a member having light-transmissive properties. First diffusion sheet 32 is a quadrilateral sheet that can cover display panel 31, and at least one side of the sheet is provided with the uneven structure having very small bumps. In a direction through which basal light 110 streams, first diffusion sheet 32 is disposed upstream of display panel 31. No other members need to be disposed between first diffusion sheet 32 and display panel 31. A material included in first diffusion sheet 32 is not limited, but resin such as PET and glass can be presented as examples.

First diffusion sheet 32 desirably includes a member having a low haze value that is a haze value less than or equal to 55%. Although an increase in a haze value can prevent the striped pattern of display light 100 which is produced based on an optical member such as Fresnel lens 35, an increase in a haze value causes a reduction (e.g., a reduction of up to 1/10) in luminance of display light 100. This embodiment uses first diffusion sheet 32 that can achieve a haze value ranging from 30% to 40%, both inclusive.

Note that a haze value is an indicator showing a degree of cloudiness of glass or plastic. The haze value is also called, for example, a cloudiness value. The lower the haze value, the higher the clarity of a material.

Light-transmissive member 33 is a member having a function of disposing first diffusion sheet 32 and second diffusion sheet 34 with a predetermined distance therebetween. Light-transmissive member 33 is a plate-like member including, for example, plastic or a transparent glass plate such as optical glass which allows basal light 110 to pass through. The thickness (a length in the Z axis direction in the diagram) of light-transmissive member 33, namely a distance between first diffusion sheet 32 and second diffusion sheet 34, is suitably more than or equal to 0.5 mm. When the thickness of light-transmissive member 33 is less than 0.5 mm, it is difficult to reduce the striped pattern visually identified as a virtual image while maintaining display light 100 having high luminance. Note that the thickness of light-transmissive member 33 is suitably less than or equal to 10 mm to render display device 20 compact. Specifically, the thickness of light-transmissive member 33 in this embodiment is 1.9 mm.

Second diffusion sheet 34 is a sheet-like member disposed spaced apart from first diffusion sheet 32 having the first diffusion structure. Second diffusion sheet 34 has a second diffusion structure that diffuses basal light 110 that enters first diffusion sheet 32 via light-transmissive member 33. Like the first diffusion structure, the second diffusion structure is a structure having a function of improving the uniformity ratio of basal light 110 that enters the first diffusion structure. Specifically, like the first diffusion structure, the following structures can be exemplified as the second diffusion structure: (i) an uneven structure including very small bumps which is provided on a surface of a member having light-transmissive properties, (ii) a structure in which fine particles reflecting basal light 110 are dispersedly provided inside a member having light-transmissive properties, and (iii) a structure in which very small cavities are dispersedly provided inside a member having light-transmissive properties. Like first diffusion sheet 32, second diffusion sheet 34 is a quadrilateral sheet that can cover display panel 31, and at least one side of the sheet is provided with the uneven structure including very small bumps. In the direction through which basal light 110 streams, second diffusion sheet 34 is disposed upstream of light-transmissive member 33. Any other member may be disposed between first diffusion sheet 32 and light-transmissive member 33 and between second diffusion sheet 34 and light-transmissive member 33. A material included in second diffusion sheet 34 is not particularly limited, but resin such as PET and glass can be presented as examples.

Second diffusion sheet 34 desirably include a member having a low haze value that is a haze value less than or equal to 55%. Although an increase in a haze value can prevent the striped pattern of display light 100 produced based on an optical member such as Fresnel lens 35, an increase in a haze value causes a reduction (e.g., a reduction of up to 1/10) in luminance of display light 100. This embodiment uses second diffusion sheet 34 that can achieve a haze value ranging from 30% to 40%, both inclusive.

In this embodiment, second diffusion sheet 34 uses the same type of sheet as first diffusion sheet 32.

Figure 6:
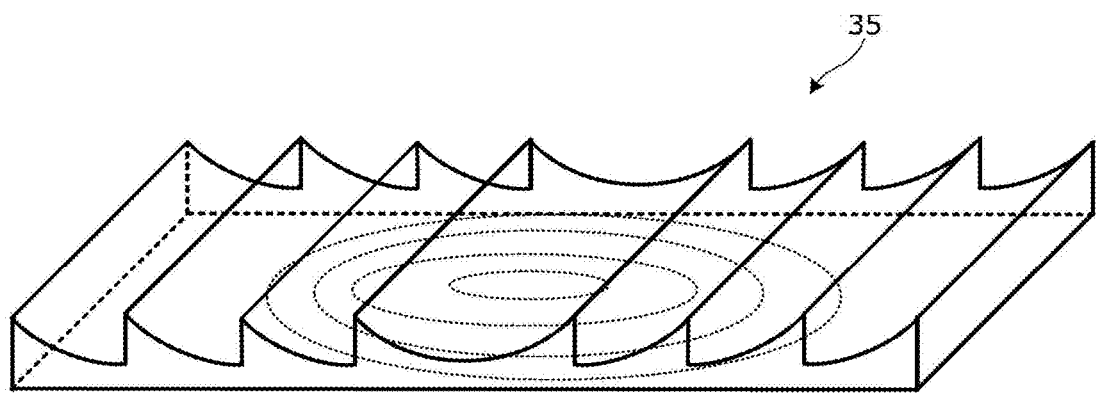
FIG. 6 is a perspective view of a Fresnel lens as an optical member.

Fresnel lens 35 is an optical member for causing display light 100 produced by display panel 31 based on basal light 110, particularly display light 100 in the vicinity of display panel 31, to efficiently travel toward an eye-box. In this embodiment, Fresnel lens 35 is disposed upstream of second diffusion sheet 34 in the direction through which basal light 110 streams. Fresnel lens 35 is a molded resin component. As illustrated in FIG. 6, a linear Fresnel lens having a saw-tooth shaped cross section is provided on an optical surface of Fresnel lens 35 which is on a side of display panel 31. The linear Fresnel lens includes a plurality of optical elements that extends in a first axis direction (the X axis direction in the diagram) and is disposed along a second axis direction orthogonal to the first axis direction. Fresnel lens 35 that is an optical member is disposed such that second diffusion sheet 34 and the linear Fresnel lens that is a group of the optical elements are in direct contact or in close contact with each other. An optical surface on a side of prism plate 36, which is the opposite side of the optical surface of Fresnel lens 35 on which the linear Fresnel lens is provided, is provided with a concentric Fresnel lens that includes an optical element having a sawtooth-shaped cross section and whose thickness is reduced as a result of dividing a spherical lens or an aspherical lens.

Prism plate 36 is one of optical members disposed between Fresnel lens 35 and light guide plate 37. In this embodiment, prism plate 36 is disposed upstream of Fresnel lens 35 and downstream of light guide plate 37 in the direction through which basal light 110 streams. Prism plate 36 includes, on an optical surface, a plurality of optical elements that change the traveling direction of basal light 110 by refraction such that basal light 110 that exits from exit surface 373 of light guide plate 37 to uniformly travel toward the eyes of an observer after basal light 110 passes through display panel 31. More specifically, prism plate 36 changes the traveling direction of basal light 110 such that the traveling direction is closer to the direction of display light 100 traveling from the display center of display panel 31 toward the observer.

Light guide plate 37 is a panel-like member including a transparent material such as a resin material such that basal light 110 emitted from light sources 38 disposed in a line enters, and the entered basal light 110 is guided to uniformly enter a predetermined area of display panel 31.

In this embodiment, light guide plate 37 is disposed upstream of prism plate 36 and downstream of light sources 38 in the direction through which basal light 110 streams. The optical axis of basal light 110 emitted from light sources 38 extends along the first axis (the X axis in the diagram). The predetermined area of display panel 31 extends along a plane parallel to the first axis (the XY plane in the diagram). For this reason, light guide plate 37 has a configuration in which basal light 110 that has entered from entrance surface 371 is reflected by inclined surface 372 such that the optical axis of basal light 110 is bent to 90 degrees, and exits from exit surface 373 that faces and is parallel to display panel 31. With such a configuration, light guide plate 37 guides basal light 110 emitted from light sources 38 such that basal light 110 spreads across the whole display panel 31.

Light sources 38 emit basal light 110 that is light for producing display light 100 in display panel 31. In this embodiment, basal light 110 emitted from light sources 38 changes the traveling direction (changes from the X axis direction to the Z axis direction in the diagram) while passing through light guide plate 37, passes through prism plate 36, Fresnel lens 35, second diffusion sheet 34, light-transmissive member 33, and first diffusion sheet 32 in the stated order, and arrives at display panel 31. The type of light sources 38 is not particularly limited, but light emitting diodes (LEDs) are used in this embodiment. A plurality of light sources 38 of the same LED type are mounted on base 39 and aligned along light guide plate 37.

As has been described above, display device 20 according to the embodiment uses Fresnel lens 35 as an optical member. With this, thinning (downsizing) of display device 20 is achieved as compared to the case where a normal optical lens is used. In between Fresnel lens 35 and display panel 31, first diffusion sheet 32 and second diffusion sheet 34 are disposed spaced apart from each other with a predetermined distance therebetween. With this, a striped pattern in display light 100 which is produced based on Fresnel lens 35 can be reduced to a degree that a driver is unable to visually identify the striped pattern. In addition, since a distance between first diffusion sheet 32 and second diffusion sheet 34 is less than or equal to 10 mm (about 2 mm in this embodiment), the distance does not quite affect thinning of display device 20.

Since first diffusion sheet 32 and second diffusion sheet 34 each having a haze value (e.g., 35%) lower than a haze value (e.g., 87%) that enables a single diffusion sheet to reduce the striped pattern in display light 100 to a degree that the striped pattern is visually unidentifiable, a reduction in luminance and luminance irregularity of display light 100 can be kept within an allowable range (to a degree that a driver is unable to notice).

A reduction in stripes in a striped pattern in display light 100 can be achieved by, for example, making Fresnel pitches of Fresnel lens 35 as fine as pixels of display panel 31. This, however, requires fine patterning of a mold used for resin molding, and thus leads to an increase in manufacturing costs. The striped pattern may be reduced by a reduction in R of a distal edge of Fresnel lens 35, but the processing of a mold is difficult. Even if the mold can be processed, filling of resin up to the distal edge is difficult. Meanwhile, the use of first diffusion sheet 32 and second diffusion sheet 34 which are disposed with a predetermined distance therebetween can reduce the striped pattern with a simple configuration, even if readily available resin Fresnel lens 35 is used.

Note that the present disclosure is not limited to the above-described embodiments. For example, the present disclosure may include different embodiments realized by (i) optionally combining the structural elements described in the description, and (ii) excluding some of the structural elements described in the description. Moreover, the present disclosure also includes variations achieved by applying various modifications conceivable to those skilled in the art to each of the embodiments etc. without departing from the essence of the present disclosure, or in other words, without departing from the meaning of wording recited in the claims.

Figure 7:
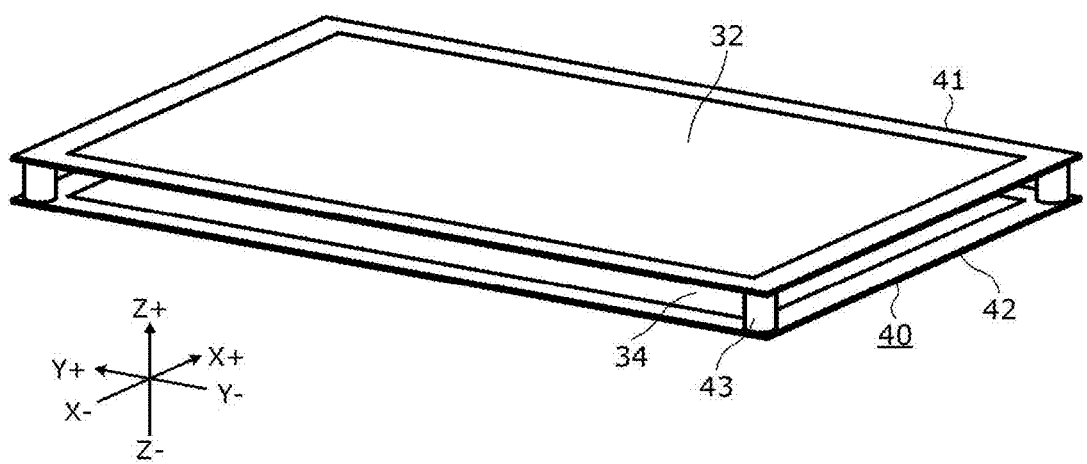
FIG. 7 is a perspective view of diffusion sheets disposed with a predetermined distance therebetween by a holder.

For example, as illustrated in FIG. 7, display device 20 may include holder 40 that holds first diffusion sheet 32 and second diffusion sheet 34 with a predetermined distance therebetween. Holder 40 includes first frame 41 that holds the peripheral portion of first diffusion sheet 32, and second frame 42 that holds the peripheral portion of second diffusion sheet 34. First frame 41 and second frame 42 are coupled together by pillars 43 provided at the four corners. The length of pillars 43 sets the distance between first diffusion sheet 32 and second diffusion sheet 34. In this case, a space without an object, such as light-transmissive member 33, is created between first diffusion sheet 32 and second diffusion sheet 34.

Moreover, as illustrated in FIG. 8, display device 20 need not include first diffusion sheet 32 having the first diffusion structure and second diffusion sheet 34 having the second diffusion structure. Instead, display device 20 may include light-transmissive member 33 provided with uneven first diffusion structure 51 on a first principal surface of light-transmissive member 33 which faces display panel 31, and uneven second diffusion structure 52 on a second principal surface that is on the opposite side of the first principal surface.

In addition, although a liquid crystal panel that is a spatial light modulator has been exemplified as display panel 31, display panel 31 is not limited to be exemplified as a liquid crystal panel. For example, display panel 31 may be a screen that produces display light 100 showing an image based on laser light that is basal light 110 emitted from light sources 38, when the following display device as illustrated in FIG. 8 is used: a display device that causes reflection scan device 60 including a drive mirror that reflects laser light to reflect laser light while changing a reflection angle to scan the laser light on display panel 31 for emission of the laser light.

The above-described embodiment has exemplified display device 20 that includes two optical members, which are Fresnel lens 35 and prism plate 36, but display device 20 may include a single optical member or three or more optical members. Moreover, an optical member may be selected from among the following: a Fresnel lens, a lenticular lens, a fly-eye lens, and a prism having, for example, an exit surface on which at least either very small protrusions or very small recesses are provided. When display device 20 includes a plurality of optical members, a combination to be selected is optional.

In addition, the optical member may include a first optical surface facing display panel 31 and a second optical surface on the opposite side of the first optical surface. At least one of the first optical surface or the second optical surface may be consisted of at least two types of the following optical surfaces: (i) a Fresnel surface; (ii) an optical surface including a plurality of convex lenses; (iii) an optical surface including a plurality of concave lenses; and (iv) an optical surface including a plurality of prisms.

Moreover, the optical member may include a first optical surface facing display panel 31 and a second optical surface on the opposite side of the first optical surface. The first optical surface and the second optical surface each may be consisted of one of the following optical surfaces: (i) a Fresnel surface; (ii) an optical surface including a plurality of convex lenses; (iii) an optical surface including a plurality of concave lenses; and (iv) an optical surface including a plurality of prisms. A type of the first optical surface and a type of the second optical surface may be different.

For example, a lenticular lens and a fly-eye lens each can be exemplified as an optical member including a plurality of convex lenses. A fly-eye lens can be exemplified as an optical member including a plurality of concave lenses.

While various aspects of the embodiment have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following patent application including specification, drawings, and claims is incorporated herein by reference in their entirety: Japanese Patent Application No. 2022-087148 filed on May 27, 2022.

INDUSTRIAL APPLICABILITY

A display device according to the present disclosure is applicable to a PGU provided in a head-up display for a vehicle, a PGU provided in other devices, etc.

The invention claimed is:

1. A display device that includes a display panel from which display light showing an image exits and a light source that emits basal light for producing the display light, the display device comprising:
   a first diffusion structure that diffuses the basal light that is to enter the display panel;
   a second diffusion structure that is disposed spaced apart from the first diffusion structure, and diffuses the basal light that is to enter the first diffusion structure; and
   an optical member that includes a plurality of optical elements each of which refracts the basal light that is to enter the second diffusion structure, wherein
   the basal light emitted from the light source passes through the optical member, the second diffusion structure, the first diffusion structure and the display panel in this order.

2. The display device according to claim 1, comprising:
   a first diffusion sheet including the first diffusion structure;

a second diffusion sheet including the second diffusion structure; and a light-transmissive member disposed between the first diffusion sheet and the second diffusion sheet.

3. The display device according to claim 1, comprising:

a first diffusion sheet including the first diffusion structure;

a second diffusion sheet including the second diffusion structure; and a holder that holds the first diffusion sheet and the second diffusion sheet with a predetermined distance therebetween.

4. The display device according to claim 1, comprising:

a light-transmissive member including a first principal surface on which the first diffusion structure is provided and a second principal surface on which the second diffusion structure is provided, the first principal surface facing the display panel, the second principal surface being on an opposite side of the first principal surface.

5. The display device according to claim 1, wherein the optical member includes a surface on which at least one of the plurality of optical elements is disposed, the surface being on a side of the second diffusion structure.

6. The display device according to claim 1, wherein the optical member includes a surface on which at least one of the plurality of optical elements is disposed, the surface being on an opposite side of the second diffusion structure.

7. The display device according to claim 1, wherein the optical member is one of the following: a Fresnel lens, a lenticular lens, a fly-eye lens, and a prism.

8. The display device according to claim 1, wherein the optical member includes a first optical surface facing the display panel and a second optical surface on an opposite side of the first optical surface, and at least one of the first optical surface or the second optical surface is comprised of at least two types of the following optical surfaces: (i) a Fresnel surface; (ii) an optical surface including a plurality of convex lenses; (iii) an optical surface including a plurality of concave lenses; and (iv) an optical surface including a plurality of prisms.

9. The display device according to claim 1, wherein the optical member includes a first optical surface facing the display panel and a second optical surface on an opposite side of the first optical surface, the first optical surface and the second optical surface each are comprised of one of the following optical surfaces: (i) a Fresnel surface; (ii) an optical surface including a plurality of convex lenses; (iii) an optical surface including a plurality of concave lenses; and (iv) an optical surface including a plurality of prisms, and a type of the first optical surface and a type of the second optical surface are different.

10. The display device according to claim 1, wherein the optical member includes an input surface on which the basal light is incident, and an output surface from which the basal light that has been incident on the input surface and passed through the optical member is emitted, the second diffusion structure includes an input surface on which the basal light emitted by the optical member is incident, the output surface of the optical member faces the input surface of the second diffusion structure, the first diffusion structure includes an output surface from which the basal light that has been incident on the input surface of the second diffusion structure and passed through the second diffusion structure and the first diffusion structure is emitted, the display panel includes an input surface on which the basal light emitted from an output surface of the first diffusion member is incident, and an output surface from which the display light produced on the display panel based on the basal light incident on the input surface of the display panel is emitted, and the output surface of the first diffusion structure faces the input surface of the display panel.

11. The display device according to claim 10, wherein each of the input surface and the output surface of the optical member, the input surface of the second diffusion structure and the output surface of the first diffusion structure extends in parallel to the input surface of the display panel.

12. A head-up display that includes a display device including a display panel from which display light showing an image exits and a light source that emits basal light for producing the display light, the head-up display comprising:

a first diffusion structure that diffuses the basal light that is to enter the display panel;

a second diffusion structure that is disposed spaced apart from the first diffusion structure, and diffuses the basal light that is to enter the first diffusion structure;

an optical member that includes a plurality of optical elements each of which refracts the basal light that is to enter the second diffusion structure; and a mirror that reflects the display light that exits from the display panel, wherein the basal light emitted from the light source passes through the optical member, the second diffusion structure, the first diffusion structure and the display panel in this order.

* * * * *